L. W. Turner,
Flour Sieve.
Nº 50,054.          Patented Sep. 19, 1865.
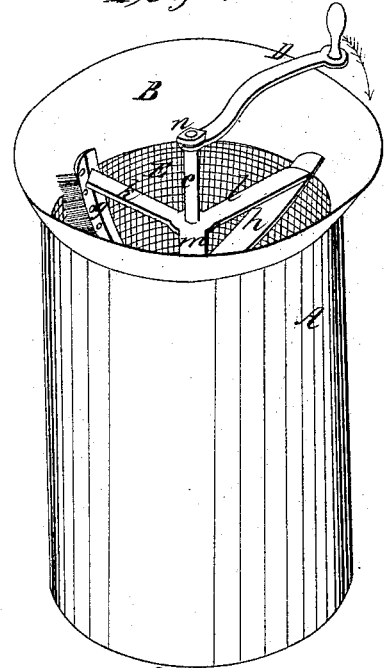
Fig: 1.
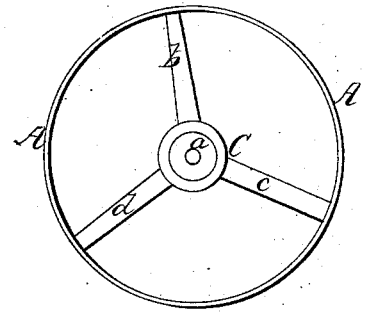
Fig: 3.
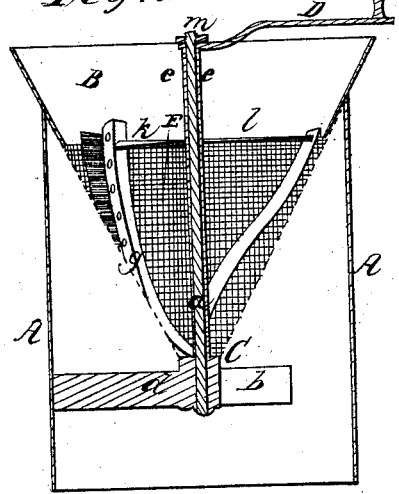
Fig: 2.
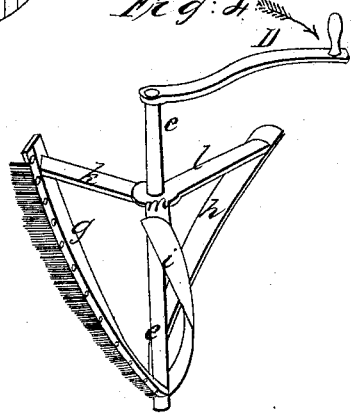
Fig: 4.
Witnesses:
Charles Schrader
R Fitzgerald
Inventor:
L. W. Turner

UNITED STATES PATENT OFFICE.

L. W. TURNER, OF MERIDEN, CONNECTICUT.

FLOUR-SIFTER.

Specification forming part of Letters Patent No. 50,054, dated September 19, 1865.

*To all whom it may concern:*

Be it known that I, LEWIS W. TURNER, of the town of Meriden, in the county of New Haven and State of Connecticut, have invented a new and useful Improvement in Flour-Sifters, as a new article of manufacture; and I do hereby declare that the following is a full, clear, and exact description of the construction, character, and operation of the same, reference being had to the accompanying drawings, which make part of this specification, in which—

Figure 1 is a perspective view of the sifter ready for use. Fig. 2 is a section of the same cut vertically through the center, showing the relative positions of the several parts. Fig. 3 is a section of the same cut horizontally through the steps or cross-trees on which the conical frame rests and revolves. Fig. 4 is a perspective of the conical frame, showing the crank, spiral blades, brush, &c.

My improvement consists in fitting a conical frame composed of a series of spirally-formed blades attached to a central socket or tube, the whole to be revolved by a horizontal crank, within a hollow cone or frustum of a cone composed principally of wire cloth or gauze sustained in a proper cylinder or box, and in using one or more brushes for the full length or extent of the wire-cloth to brush it clean and keep the meshes open.

I make the outside case of sheet metal, or of any other suitable material, of a cylindrical shape, as shown at A, Fig. 1, and indicated in vertical section at A A, Fig. 2, or of any other suitable or convenient shape. Near the lower end of this case I fit a proper step or support for the revolving frame to rest on, composed of three arms, *b*, *c*, and *d*, connected in the center, as shown in horizontal section in Fig. 3, and indicated in vertical section at *b* and *d*, Fig. 2, or in any other convenient form; and in the center of this step I secure the lower end of an upright or spindle, as shown at *a*, Fig. 2, on which the socket or tube *e* slips and revolves to sustain the conical frame, Fig. 4, as shown in Figs. 1 and 2.

I make the sieve E of wire-cloth of the suitable fineness of meshes in the form of a frustum of a cone, and I secure the base or larger end to the flaring top B of the case, and the small end to the step or support C, all as represented in section in Fig. 2 and as shown in part in Fig. 1.

I make the conical frame of three or more blades, as *g*, *h*, and *i*, Fig. 4, and fit them to the tube *e* in a spiral form, as shown in Figs. 4 and 2 and indicated in Fig. 1; and I support the upper ends by arms, as shown at *k l m*, Figs. 4 and 1, and *k l*, Fig. 2, and of a size and shape suited to the conical sieve E, as indicated in Figs. 2 and 1; and in one or more of these spiral blades for the whole length I fit bristles or fine wire in a suitable manner to form a brush, as represented at *g*, Figs. 1, 2, and 4, so that in its revolutions it will continually brush the whole of the surface of the sieve E clean and keep all of the meshes open and free.

For use I pass the socket *e* onto the upright *a*, and turn on the nut *n*, as represented in Fig. 2, when the whole will appear as shown in Fig. 1. I then pour the flour into the top and revolve the crank D in the direction indicated by the dart, when the spiral blades *h i* will loosen the flour and crush the lumps, while the brush *g* will keep the surface free from any adhesive substance and keep the meshes of the sieve open, so as to allow the flour to pass freely; and to remove the refuse I take off the nut *n*, remove the spiral frame, Fig. 4, and empty the sieve.

What I claim as my invention, and desire to secure by Letters Patent, is—

As a new article of manufacture, a flour-sifter composed of a suitable case, a conical sieve, and a revolving frame, when the frame is composed of spirally-fitted blades and a brush or brushes, and the whole is fitted for use substantially as herein described.

L. W. TURNER.

Witnesses:
CHARLES SCHRADER,
R. FITZGERALD.